May 9, 1939.　　　　　　　　F. K. FILDES　　　　　　　2,157,650
METHOD FOR CONVERTING ROAD-RAIL VEHICLES FROM ONE USE TO THE OTHER
Filed Dec. 3, 1936　　　　　　4 Sheets-Sheet 1
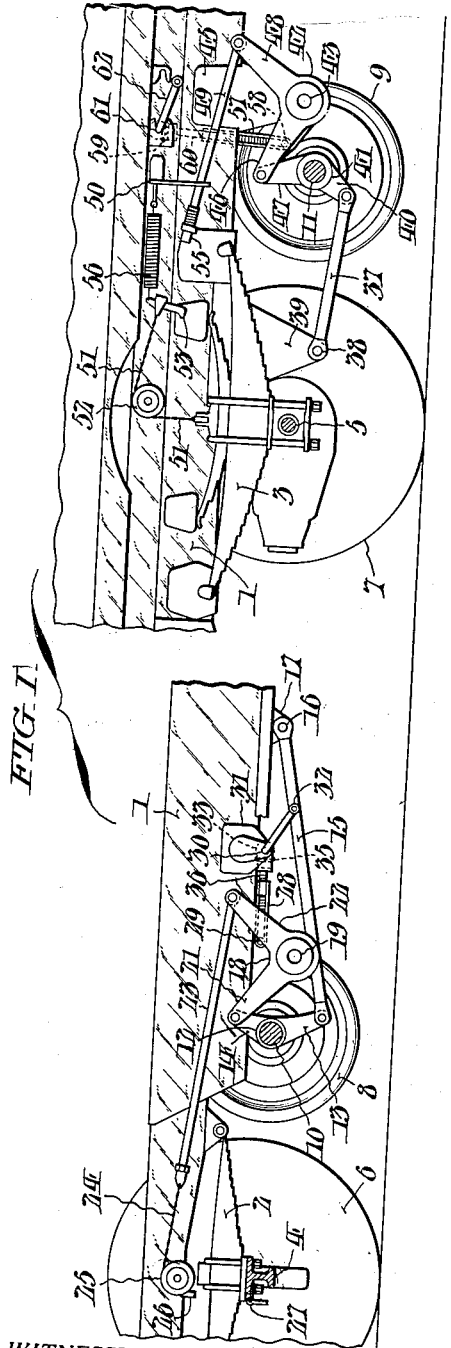
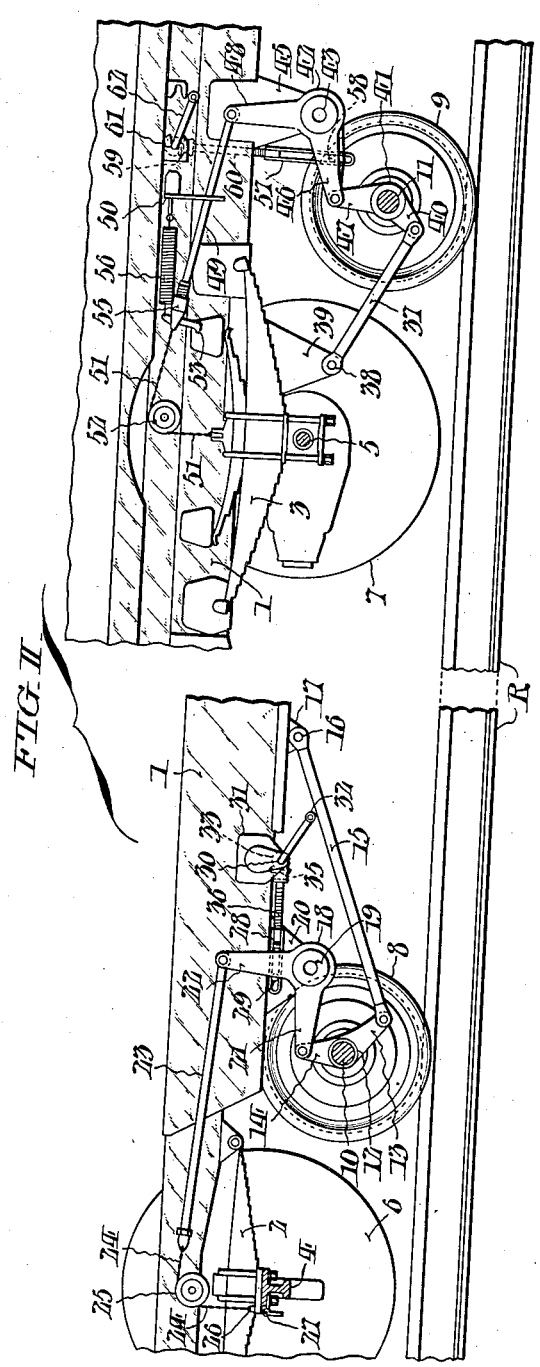
WITNESSES:
John C. Bergner
Thomas W. Kerr, Jr.
INVENTOR:
Frederick K. Fildes,
BY Fraley Paul
ATTORNEYS.

May 9, 1939. F. K. FILDES 2,157,650
METHOD FOR CONVERTING ROAD-RAIL VEHICLES FROM ONE USE TO THE OTHER
Filed Dec. 3, 1936 4 Sheets-Sheet 2
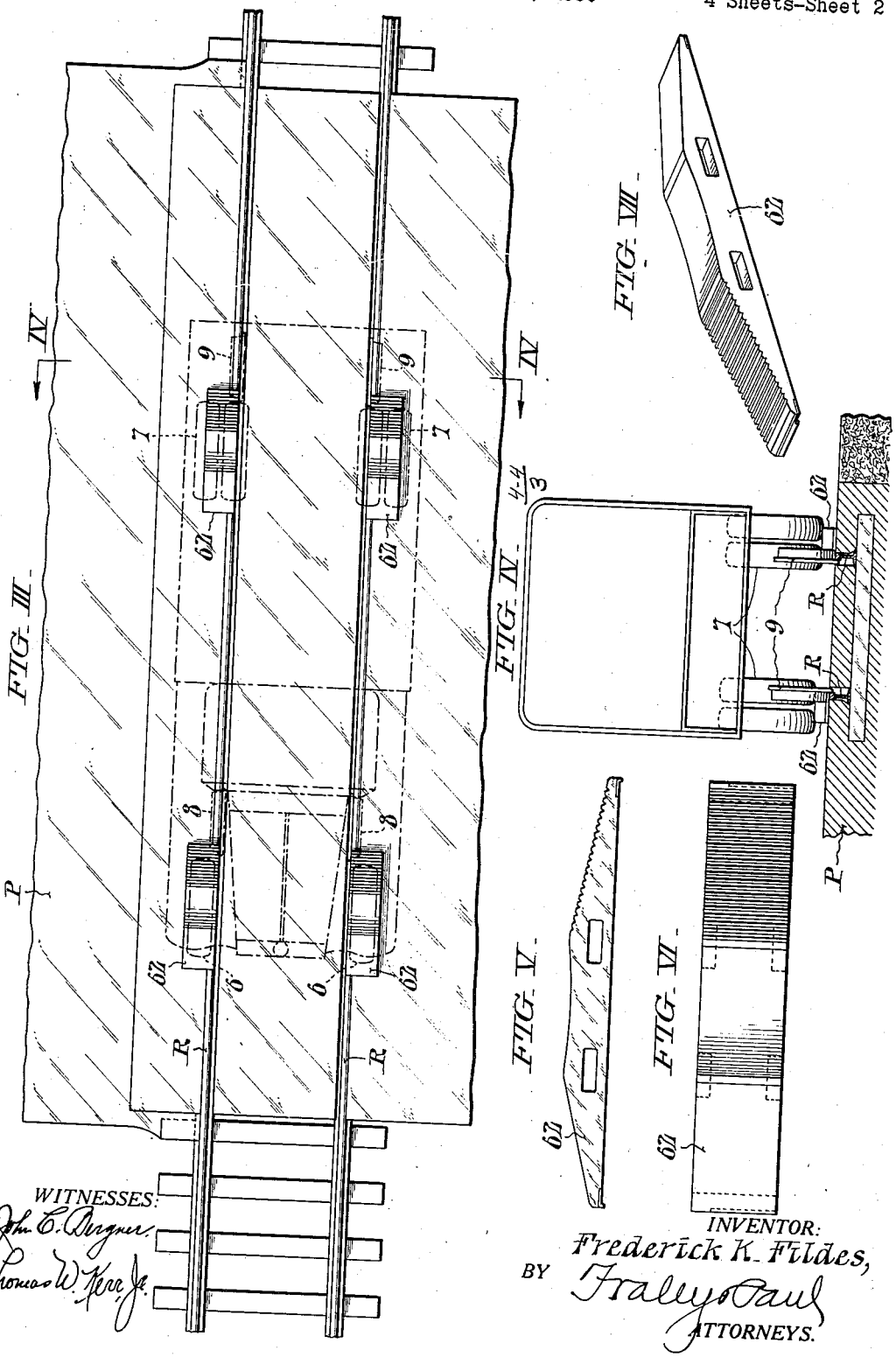

May 9, 1939.　　　　　F. K. FILDES　　　　　2,157,650
METHOD FOR CONVERTING ROAD-RAIL VEHICLES FROM ONE USE TO THE OTHER
Filed Dec. 3, 1936　　　　4 Sheets-Sheet 3
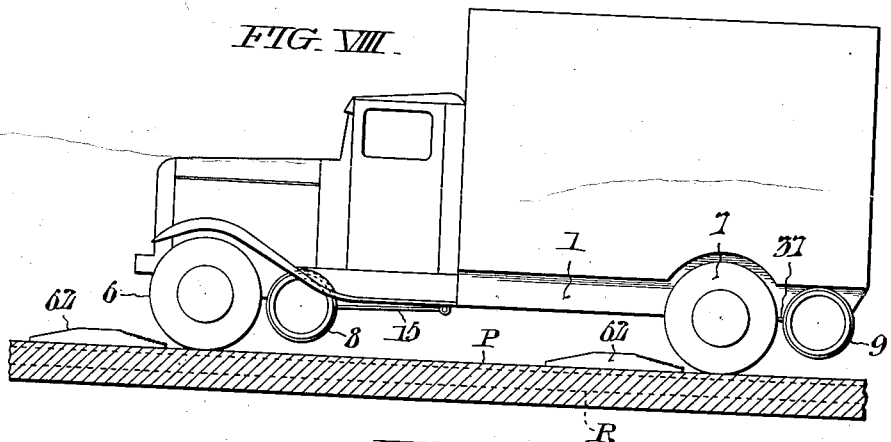
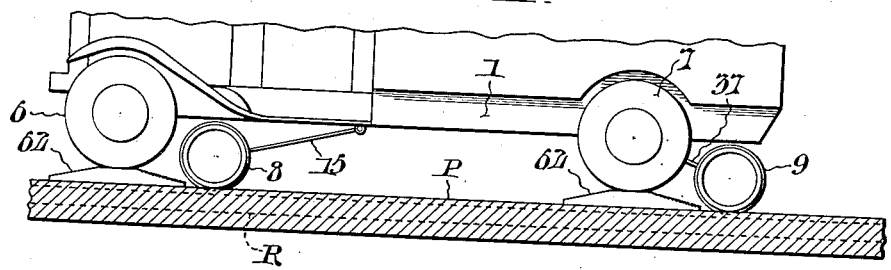
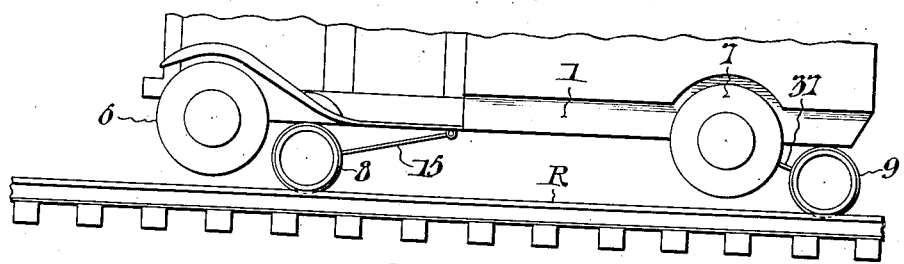
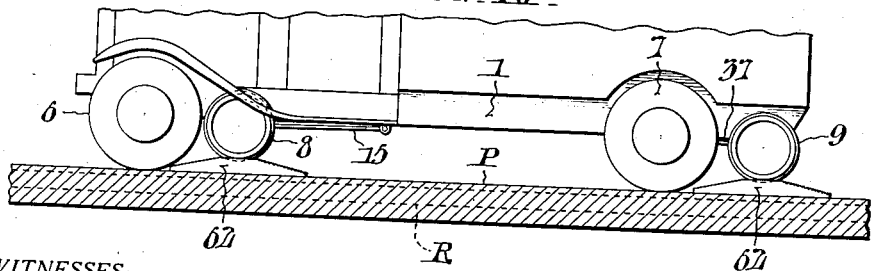
WITNESSES:
John C. Bergner
Thomas W. Kerr, Jr.
INVENTOR:
Frederick K. Fildes,
BY Bakewell & Paul
ATTORNEYS.

May 9, 1939.  F. K. FILDES  2,157,650
METHOD FOR CONVERTING ROAD-RAIL VEHICLES FROM ONE USE TO THE OTHER
Filed Dec. 3, 1936  4 Sheets-Sheet 4
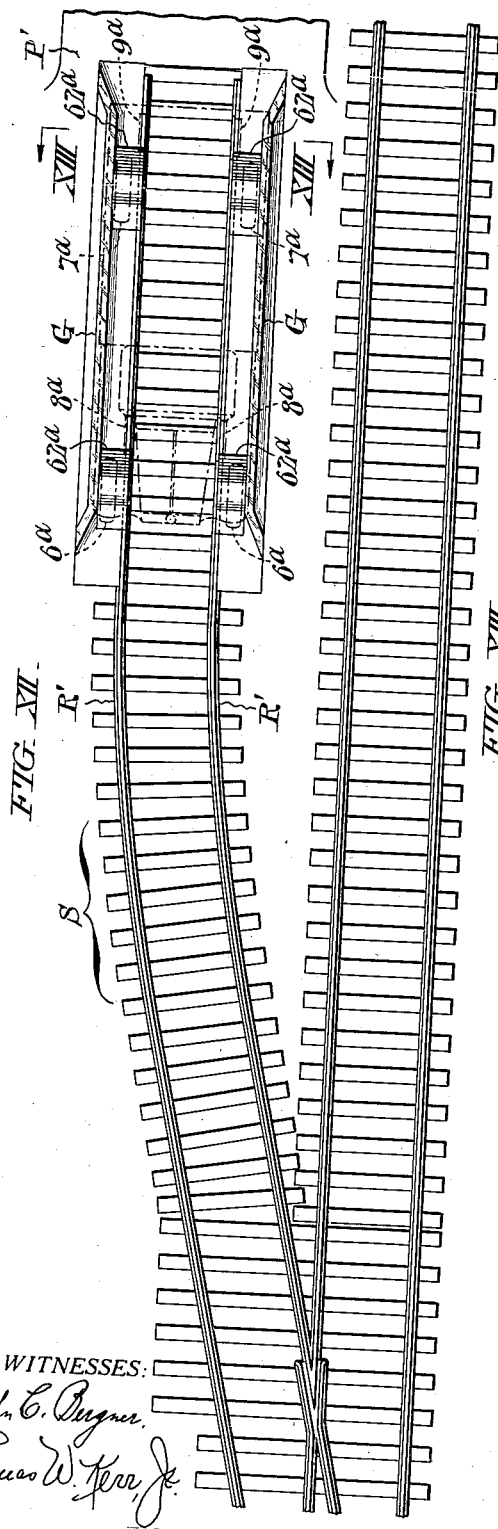
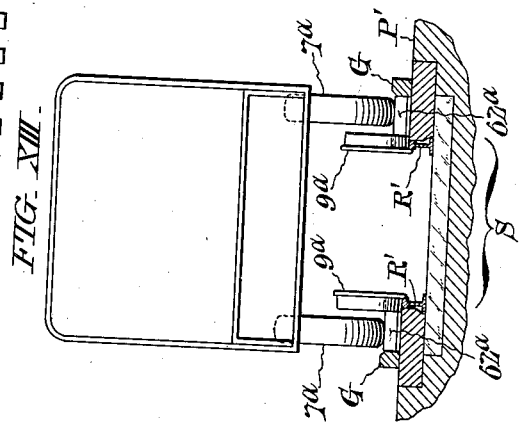
WITNESSES:
John C. Bugner
Thomas W. Kerr Jr.
INVENTOR:
Frederick K. Fildes,
BY Frally Paul
ATTORNEYS.

Patented May 9, 1939

2,157,650

UNITED STATES PATENT OFFICE 2,157,650

METHOD FOR CONVERTING ROAD-RAIL VEHICLES FROM ONE USE TO THE OTHER

Frederick K. Fildes, Altoona, Pa., assignor to The Pennsylvania Railroad Company, Philadelphia, Pa., a corporation of Pennsylvania Application December 3, 1936, Serial No. 113,974

1 Claim. (Cl. 105—215)

This invention is concerned with methods for converting road-rail vehicles having wheels for highway travel and auxiliary flanged wheels for rail travel, from one condition of use to the other.

In changing a vehicle of the kind referred to from condition for highway use to condition for rail use, the entire load must be lifted incident to substitution of the auxiliary wheels so that the highway wheels are clear of the rails during rail travel. On the other hand, change of such a vehicle from condition for rail use to condition for highway use entails the raising of the heavy auxiliary wheels to a normal inactive position so that they are clear of the road in highway travel. Both power means and manual means have been devised heretofore to effect such conversions, the first adding considerably to the complication of the power mechanisms of the vehicles and in most cases requiring re-designing of the vehicles as a whole, and the second being difficult to operate in view of the enormous weight to be lifted incident to either change, and moreover requiring the application of excessive effort on the part of the vehicle operator in making the necessary changes.

The purpose of my invention is to overcome the above-mentioned drawbacks of previous practice, which objective I realize as hereinafter more fully disclosed, through provision of a simple method whereby road-rail vehicles can be quickly and easily converted from one condition of use to the other in part with the aid of ramp blocks and by manipulation of the vehicle upon a railway siding or highway cross over platform, and in part manually, without, however, entailing the exertion of any lifting or other excessive effort on the part of the operator of the vehicle.

In the attached drawings, Fig. I is a fragmentary, broken-out view in longitudinal section, of a road-rail vehicle capable of conversion in accordance with my improved method, the vehicle being shown in condition for highway use.

Fig. II is a view like Fig. I showing the vehicle in condition for rail use.

Fig. III shows in plan, a highway cross over platform on which a road-rail vehicle, having double rear drive wheels, is manipulated incident to conversion according to my new method.

Fig. IV is a cross section taken as indicated by the arrows IV—IV in Fig. III.

Figs. V and VI are respectively a side elevation and a plan view of one of the ramp blocks employed in my method.

Fig. VII shows the ramp block in perspective.

Figs. VIII, IX, X, and XI are diagrammatic views showing successive steps in the method.

Fig. XII is a view corresponding to Fig. III, showing a railway track with a siding platform suitable for the practice of my method with road-rail vehicles having single rear driving wheels;

Fig. XIII is a cross section taken as indicated by the arrows XIII—XIII in Fig. XII.

Referring first more particularly to Figs. I and II of these illustrations, the vehicle there shown is in the form of a motor truck having its chassis frame 1 and body supported, with interposition of semi-elliptic springs 2 and 3, by axles 4 and 5 respectively carrying single front steering wheels 10 and double rear driving wheels 6 and 7 (see Figs. III and IV) respectively for highway use. For rail use, the truck is provided with flanged front and rear auxiliary wheels 8 and 9 respectively on axles 10 and 11, the axle 10 being journaled within a bearing housing 12 having near its opposite ends, pairs of angularly spaced radial projecting lugs 13 and 14, and said housing 12 being rotatively free on said axle 10.

At each side of the truck, there is a suspension for the front auxiliary wheel axle 10 including a radius rod 15 whereof one end is fulcrumed at 16 to a pendant bracket 17 on said frame and whereof the other end is pivotally connected to the corresponding lug 13 on the bearing housing 12. Each suspension further includes a bell crank 18 which is fulcrumed at 19 on another pendant bracket 20 at the corresponding side of the chassis frame 1. The arm 21 of the bell crank lever 18 is pivotally connected to the corresponding lug 14 on the axle housing, and to the other arm 22 of said bell crank is similarly connected one end of a horizontal link bar 23. Permanently secured to the other end of the link bar 23 is a length of chain 24 which passes over and then downward around the top of a directional pulley 25 on the chassis frame. At the free end of the chain 24 is a block 26 capable of being coupled with a slide bolt 27 on the front axle 4 when the vehicle is to be converted for rail use. Normally the auxiliary wheels 8 are held in the raised position shown in Fig. I clear of the road by means of slings 28, which respectively engage pins 29 on the arms 22 of the bell cranks 18. The slings 28 are operable simultaneously to let down the auxiliary wheels 8 when the truck is to be arranged for rail travel, by mechanism which comprises a transverse shaft 30, said shaft being journaled in suitable bearing brackets 31 on the chassis frame, and having a crank handle 32 at one end thereof. The shaft 30 moreover, carries beveled pinions 33 which mesh with companion pinions 35 on actuating screws 36 in engagement with the slings 28.

The suspensions for the rear set of auxiliary wheels 9 are similar to those of the front auxiliary wheels and likewise duplicated at opposite sides of the truck, each of them including a radius rod 37 whereof one end is fulcrumed at 38 on a fixed bracket 39 pendant from the chassis frame 1 and whereof the other end is pivotally connected to a radial lug 40 on the tubular housing 41 for the rear auxiliary axle 11, which housing is rotatively free on said axle. Each of the rear suspensions further comprises a bell crank 42 which is fulcrumed at 43 on a pendant bracket 45 on the chassis frame 1, with one of its arms 46 pivotally connected to a projecting lug 47 on the axle housing 41 circumferentially spaced from the projection 40. To the other arm 48 of the bell crank 42 is pivotally connected one end of a horizontal link bar 49 which is normally supported, as shown in Fig. I, by a vertically hanger bracket 50 on the chassis frame 1. To the center of each rear spring 3 is secured a chain 51 which passes upward and around the top of a directional guide pulley 52 on the chassis frame 1, and which is fitted at its free end with a coupling member 53 capable of being engaged with a companion coupling member 55 at the free end of the link rod 49. In each instance, a spring 56 serves to normally support the chain 51 to prevent it from dangling when disconnected from the link rod 49. The lifting sling 57 for each rear suspension engages a pin 58 on the arm 46 of the corresponding bell crank 42, and has a pinion 59 on its actuating screw 60 in mesh with a corresponding companion pinion on a cross shaft 61 provided with an actuating crank handle 62 at one end thereof.

The road-rail truck briefly described up to this point constitutes the subject of a separate application Serial Number 113,975 filed by me December 3, 1936.

To convert such a truck from the condition for highway use shown in Fig. I to condition for rail use, in accordance with my improved method, the same is driven onto a railway crossing platform such as shown at P in Figs. III and IV flush with the tops of the rails R and at the same time longitudinally aligned centrally over said rails. Ramp blocks 62 such as shown in Figs. V—VII are thereupon placed on the platform P immediately ahead of the highway wheels 6 and 7 as shown in Fig. VIII with the inner edges of said blocks flush with the inner edges of the rail heads as shown in Fig. IV. With this preparation, the wheels 6 and 7 are run up the ramp blocks 62 to the position shown in Figs. III, IV, and IX. The front and rear auxiliary wheels 8 and 9 are then lowered to the rails as shown in Fig. IX by letting down the suspensions which is accomplished through actuation of the crank handles 32 and 62 incident to which the axle housings 12 and 41 move about the axles 10 and 11; the chains 24 connected to the main front axle 4; and the link rods 49 coupled with the chains 51. Finally, the wheels 6, 7 are backed off the ramp blocks 62 and the latter removed, with the result that the load is transferred to the auxiliary wheels 8, 9 as shown in Figs. II and X, with the springs 2, 3 ready to absorb the shocks of rail travel.

To restore the truck to condition for highway use, it is again driven to a platform like the one at P in Figs. III and IV; the ramp blocks 62 placed ahead of the wheels 6, 7 as before in Fig. VIII; and the latter again run up said blocks as in Fig. IX to enable disconnection of the chains 24 from the front axles 4, and disconnection of the link rods 49 from the chains 51. The truck is thereupon advanced slightly to run the wheels 6, 7 off the ramp block 62 and at the same time run the auxiliary wheels up said blocks as shown in Fig. XI. As a consequence, the auxiliary wheels 8, 9 and their suspensions are elevated to the normal inactive position of Fig. I incident to which the housings 12 and 41 pivot on the axles 10 and 11 as before and the pins 29, 58 on the bell cranks 18, 41 of the suspensions move freely along the open slings 28, 57. Finally, the slings 28, 57 are operated by means of the crank handles 32, 62 to secure the auxiliary wheels in raised position, and the truck thereafter advanced slightly to run the auxiliary wheels 8, 9 off the ramp block 62 with attendant transfer of the load back to the plain wheels 6, 7 as in Fig. I. Thus in both conversions, no manual effort is required other than to operate the crank handles 32 and 62 in letting down the said auxiliary wheels and to reset the slings 28 and 57 after said auxiliary wheels have been raised by the ramp blocks.

In converting the truck of the type shown in Figs. XII and XIII having single rear drive wheels 7a (but otherwise like the truck of Figs. I and II) from one condition of use to the other, according to my method I run the truck onto a rail siding S having a platform P' flush with the tops of the rails R', said platform being in this instance provided with guides G for the wheels to facilitate centering and aligning of the truck relative to the rails. The successive steps in effecting the conversions are otherwise identical to those hereinbefore explained in connection with Figs. I–V. To preclude the necessity for repetitive description, all the parts of the truck in Figs. XII and XIII not specifically referred to have been identified by the same reference numerals previously employed with addition of the letter "a" in each instance for the purpose of distinction.

Having thus described my invention, I claim:

The method of manipulating a convertible road-rail motor vehicle having a body, two pairs of plain highway wheels on the body, two pairs of auxiliary flanged wheels connected to the body with capacity for being raised above or lowered below the plain wheels, means whereby the auxiliary wheels may be secured either in raised or lowered positions, and power means on the vehicle capable of selective use to drive either the plain or the auxiliary wheels, said method comprising placing on a station platform flush with the tops of the rails of a railway track, adjacent each rail, a pair of ramp blocks; then driving the vehicle onto the platform under propulsion of its plain wheels and running the latter up the ramp blocks; then releasing the flanged wheels and allowing them to lower by gravity onto the track rails; then securing the flanged wheels in lowered position; then running the plain wheels off the blocks for support of the vehicle by the flanged wheels; then driving the vehicle on the track to the desired destination under propulsion of the flanged wheels; then placing the ramp blocks as before on a platform flush with the tops of the rails at the destination station and running the plain wheels up the blocks; then unsecuring the flanged wheels; then running the plain wheels off the blocks and at the same time running the flanged wheels up the blocks thereby effecting their elevation to normal raised positions; then securing the flanged wheels in raised position; and finally driving off the platform under propulsion of the plain wheels.

FREDERICK K. FILDES.